Oct. 23, 1945.  F. TODD  2,387,479
APPARATUS FOR THE FRACTIONAL CONDENSATION OF MIXED VAPORS
Filed July 26, 1943  2 Sheets-Sheet 1
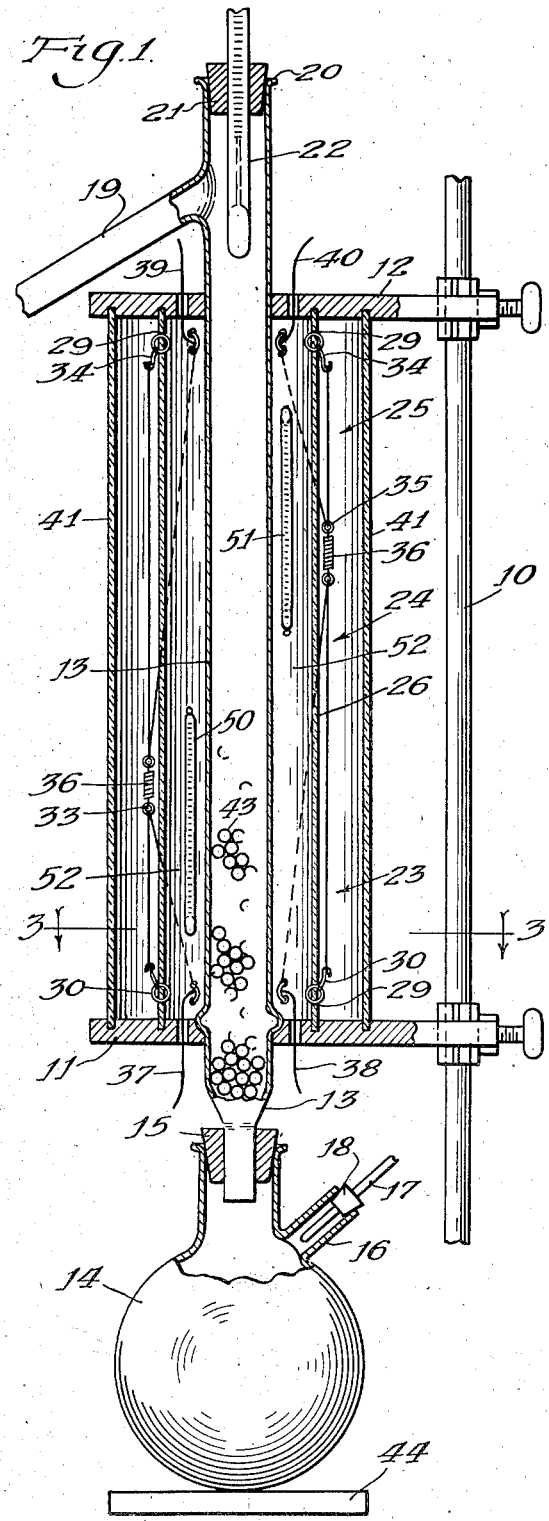
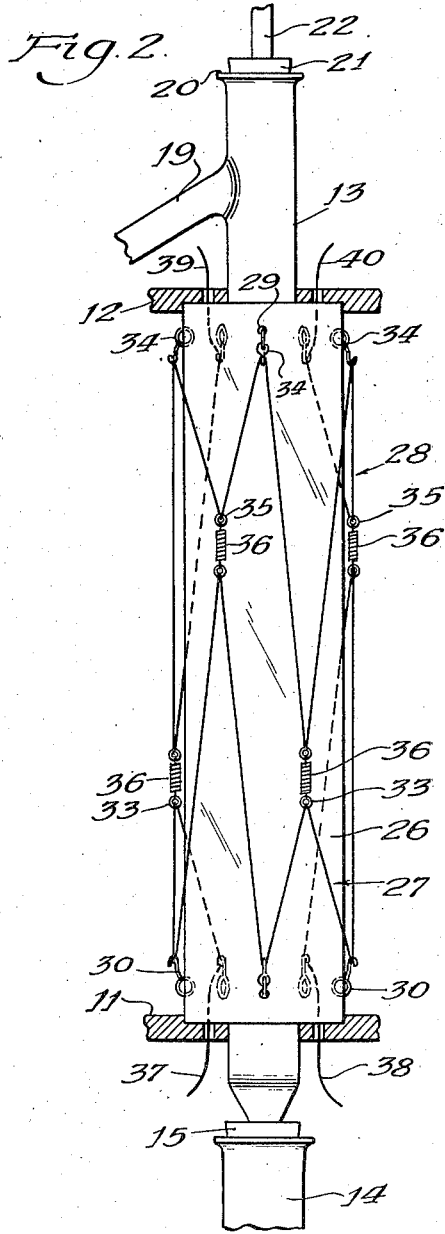
Inventor:
Floyd Todd
By Zabel, Cashow, Fitzhugh & Wells
Attorneys Oct. 23, 1945.  F. TODD  2,387,479
APPARATUS FOR THE FRACTIONAL CONDENSATION OF MIXED VAPORS
Filed July 26, 1943  2 Sheets-Sheet 2
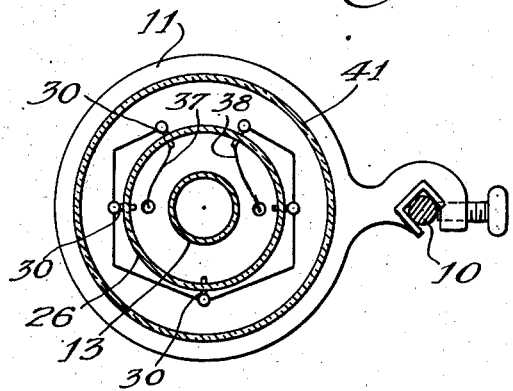
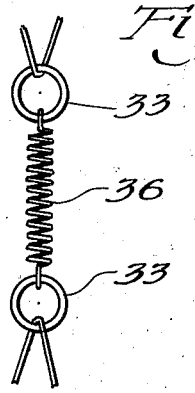
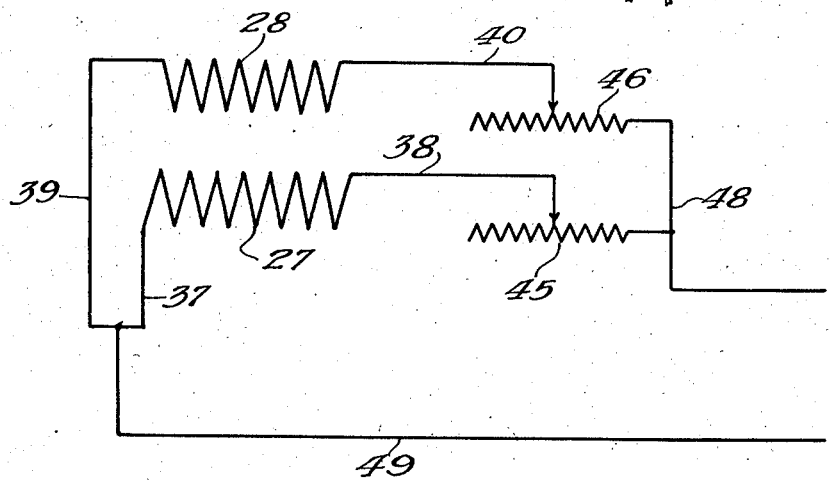
Inventor:
Floyd Todd
By Zabel, Carlson, Greitzbaugh & Wells
Attorneys Patented Oct. 23, 1945

2,387,479

UNITED STATES PATENT OFFICE 2,387,479

APPARATUS FOR THE FRACTIONAL CONDENSATION OF MIXED VAPORS

Floyd Todd, Drexel Hill, Pa.

Application July 26, 1943, Serial No. 496,172

4 Claims. (Cl. 219—19)

This invention relates to improvements in a method of and apparatus for the fractional condensation of mixed vapors and in particular for maintaining a substantially uniform temperature gradient between the inlet and outlet of a fractionating column.

In that particular embodiment of my invention which is herein disclosed the invention has been applied to a fractionating column for laboratory use, but it is obvious that the principles may be applied to fractionating columns adapted for other uses, and fractionating columns of various types such as a plate column or a belt column.

It is a well established fact that in order to obtain maximum efficiency with any fractionating column it must be operated adiabatically, that is, without heat interchange. This is particularly important when fractionating mixtures the components of which have close boiling points. The large petroleum refinery fractionating columns operate practically adiabatically. This is primarily due to the large through-put of the column compared to the heat losses of the column. However, in laboratory fractionating columns the column through-put is comparatively small and as a result external insulation has often been provided to prevent heat losses. For instance, a vacuum jacket has been provided as insulation but even with this type of insulation heat losses become quite significant at elevated temperatures.

As an alternative it has been the practice to heat the fractionating column externally in order to offset the heat loss. This method is open to the objection that the heat loss of the column will vary from one type of mixture to another, depending upon the temperatures of the vapors. This necessitates the use of a method of external heating which is subject to close control.

It is an object of my invention to provide an improved external heating means for a fractionating column that may be closely controlled to offset the heat loss of the column under different conditions of operation.

It is a further object of this invention to provide an external heating device which supplies a greater amount of heat to the lower portions of the fractionating column than to the upper portions of the fractionating column.

A still further object is to provide an improved method of externally heating a fractionating column so that the temperature gradient from the bottom of the top of the column may be maintained substantially at the maximum efficiency.

A still further object is to provide external heating means which comprises two separate electrical heating elements disposed at the bottom and at the top respectively of the fractionating column and overlapping in the central portion so that a substantially uniform temperature gradient may be maintained within the column.

Still another object is to provide improved means of mounting a heating element circumferentially with respect to the fractionating column.

Other objects, features and advantages will become apparent as the description proceeds.

With reference now to the drawings in which like reference numerals designate like parts:

Fig. 1 is a sectional elevation of a preferred embodiment of my invention;

Fig. 2 is an elevation of the apparatus shown in Fig. 1, the outer shell having been removed to more clearly show the relationship of the separate heating elements;

Fig. 3 is a section taken along the line 3—3 of Fig. 1;

Fig. 4 is a circuit diagram of the heating elements and the rheostats in circuit therewith; and Fig. 5 is a detailed view of the means by which the two separate heating elements are associated with each other.

With reference now to Fig. 1, the reference numeral 10 designates the usual upright structural member, to which are secured the usual lower support 11 and upper support 12 by clamping means well known in the art. A fractionating column, which may be provided with a suitable packing of glass beads 43, is mounted in the upper and lower supports. A flask 14 is disposed beneath the fractionating column and may be mounted on a suitable heating element designated generally by the reference numeral 44. The flask 14 is provided with a stopper 15 which receives the lower reduced end of the fractionating column 13. It is also provided with a spout 16 having a stopper 18 in which a thermometer 17 is disposed in order that the boiling temperature of the mixture within the flask may be extended. At the upper end of the fractionating column there is an outlet 19 which leads to the usual condenser, not shown. The mouth 20 of the fractionating column is provided with a stopper 21 through which a thermometer 22 extends in order that the temperature at the top of the column may be ascertained. In operation, the temperature within the fractionating column will vary at different points along its length, the temperature being at a maximum at the lower portion thereof and at a minimum at the upper portion thereof. Under adiabatic operation, the temperature at the lower portion will be substantially the same as that of the boiling point of the mixture in flask 14, as indicated by the thermometer 17, while the temperature at the upper portion thereof will be substantially the same or only slightly above the boiling point of the more volatile component, this temperature being indicated by the thermometer 22. For the purposes of this discussion it will be assumed that the temperature gradient from the bottom to the top will be a uniform gradient under adiabatic conditions. Actually the optimum gradient may be something other than uniform, and the disposition of the heating elements hereinafter described can be varied from the disposition shown in order to produce the optimum results.

For the purposes of this discussion, however, the fractionating column is shown as being divided into a lower zone, a middle zone and an upper zone, each zone being designated generally by the reference numerals 23, 24 and 25, respectively. It is the purpose of the heating elements hereinafter described to maintain the temperature in the lower zone 23 substantially the same as the boiling point of the mixture, to maintain the temperature of the upper zone 25 substantially the same or slightly greater than the boiling point of the more volatile component, and to maintain the middle zone 24 at a temperature somewhere in between the temperature of the upper and lower zones, with a gradual gradation from one zone to the other.

A glass tube 26, mounted between the supports 11 and 12, surrounds the fractionating column 13 and serves as a support for two separate heating elements, a lower heating element 27 and an upper heating element 28. The glass tube 26 is provided with apertures 29 drilled therethrough near its upper and lower edges. Suitable securing means such as small steel hooks 30, are provided at the lower part of the glass tube 26 on which the lower heating element 27 may be mounted, and like devices shown as hooks 34 may be provided at the upper portion of the glass tube 26 from which the upper heating element 28 may be suspended. Each hook may be received in one of the apertures 29.

The upper heating element 28 is suspended from the hooks 34 in loops, and the lower heating element 27 is disposed in upwardly extending loops from the hooks 30, the apices of corresponding loops in the two series being joined together by a suitable securing device comprising a spring 36 having insulating members 33 and 35 attached to either end. These insulating members may be in the form of a ring of porcelain through which the heating element is threaded, the ring being hooked on to the end of the spring 36.

It will be seen that after the parts are assembled the lower heating element will be tensioned between the hooks 30 and the rings 33, and the upper heating element will be tensioned between the hooks 34 and the rings 35, the springs 36 serving to keep the heating elements under the proper tension and permitting extra expansion and contraction of the heating elements due to temperature changes.

It will be noted that there are five hooks 30 at the lower portion of the glass tube 26 and five hooks 24 at the upper portion. The hooks 30 are spaced somewhat less than 90° from each other, with the exception of the two terminal hooks which are more closely spaced. The end portions of the lower heating element 27 are given a few turns around the terminal hooks 30 and the ends are then brought out through the lower support 11, these ends forming leads 37 and 38. Similarly the end portions of the upper heating element 28 form leads 39 and 40 which are brought out through suitable apertures in the upper support 12, after having first been secured to the terminal hooks. The heating elements may be of Chromel, Nichrome, or other suitable resistance wire. An outer tube 41, suitably positioned between and supported by the lower and upper supports 11 and 12, surrounds the heating elements 27 and 28 and serves as a shield in order to prevent temperature fluctuations due to air currents.

A rheostat 45 is provided for the lower heating element 27, and a like rheostat 46 is provided for the upper heating element 28. Reference to Fig. 4 will indicate that the lead 38 is connected to the sliding element of rheostat 45 and lead 40 is connected to the sliding element of rheostat 46. Rheostats 45 and 46 are connected to a suitable source of power, such as a 110 volt alternating current line by means of a conductor 48, and leads 37 and 39 are connected to the source of power by means of a conductor 49. It will be seen, therefore, that the current flowing through the heating elements 27 and 28 can be independently controlled by the rheostats 45 and 46 respectively.

The heating element 27 is disposed primarily about the lower zone 23, and the heating element 28 is disposed primarily about the upper zone 25. It will be noted, however, that alternate loops of the heating element 27 extend upwardly into the middle zone 24, and alternate loops of the upper heating element 28 extend downwardly into the middle zone 24. This staggered or interleaving relationship provides a means for heating the middle zone 24 so that the temperature thereof can be maintained at a point somewhat between the temperatures of the lower zone 23 and the upper zone 25. As a matter of practice it has been found that this arrangement serves to maintain a continuously decreasing temperature from the bottom of the fractionating column to the top. To secure a uniform temperature gradient, that is, one which increases proportionately to the distance from the top of the fractionating column to the bottom, one adjusts the lengths of the loops of the lower and upper heating elements so that the staggered or interleaving portions of the loops are substantially symmetrically arranged to the middle zone 24. Of course to secure any other type temperature gradient, the disposition of the loops may be varied accordingly.

Thermometers 50 and 51 are disposed in the space 52 between the fractionating column 13 and the glass tube 26. The thermometer 50 is disposed at the bottom of this space or chamber so that it will indicate the temperature at the bottom portion. The thermometer 51 is disposed in the upper portion of the space or chamber 52 so as to indicate the temperature at the top portion.

In operation, after the apparatus is set up the mixture contained in the flask 14 may be boiled to set the apparatus in operation. During this trial run there will be a certain amount of heat loss by radiation from the fractionating column 13. The heating elements 27 and 28 may then be cut into circuit by operation of the rheostats 45 and 46. As the rheostat 46 is regulated, the temperature at the top of the fractionating column will vary, as indicated by thermometer 22, and the temperature at the top of the space 52 will vary, as indicated by the thermometer 51. The boiling point of the more volatile component being known, the rheostat 46 is regulated so as to bring the temperature shown by thermometer 22 up to, or slightly more than the boiling point of the more volatile component. The readings of the thermometers 22 and 51 may then be compared to indicate the temperature difference between the interior of the fractionating column and the space 52. This difference between external and interior temperatures will be of assistance in regulating rheostat 45. For instance, if this difference is two-tenths of a degree at the top of the apparatus the rheostat 45 should be adjusted so that the thermometer 50 will read two-tenths of a degree below the temperature indicated by thermometer 17. Experience will indicate that the temperature under optimum conditions will be somewhat greater at the lower portion of the apparatus than at the upper, and the rheostat 45 may be regulated further to bring down the external temperature by an amount which can be best ascertained by experimentation.

As the distillation process proceeds, the composition of the mixture in the flask 14 will vary as the less volatile component is distilled out. This will have the effect of raising the boiling point, and there may be some necessity to further regulate the rheostat 45 to increase the amount of heat applied to the lower and middle portions of the fractionating column. It will be noted in this connection that as the amount of heat furnished by the heating element 27 is increased, the middle zone will receive a smaller amount of increased heat than the lower zone, due to the interleaving relationship of the heating elements 27 and 28. Therefore the temperature gradient from the bottom to the top of the fractionating column will remain substantially uniform.

Although I have described but one preferred embodiment of my invention, it will be understood that various modifications and changes may be made therein without departing from the scope thereof. The drawings and description herein are intended to be illustrative only and my invention is to be limited only by the appended claims.

I claim:

1. In combination with a fractionating column having an inlet at the lower end and an outlet at its upper end, separate heating units externally disposed for the lower and upper portions thereof, each being arranged so as to provide substantially uniform circumferential radiation and at said upper and lower portions, and each of said heating units overlapping at said middle portion in such a manner that the heat radiated by both in said middle portion will be of an amount greater than that radiated by one of said heating elements in said upper portion and less than that radiated by the other of said heating elements in said lower portion, and separate control devices for each whereby the heat radiated by said lower heating unit and received at the lower portion of said fractionating column will substantially equalize the heat loss of the lower portion of said fractionating column and whereby the heat radiated by said upper heating unit and received at said upper portion of said fractionating column will substantially equalize the heat loss of the upper portion of said column.

2. In an apparatus of the class described, a fractionating column, a tubular member surrounding the same and upper and lower heating elements associated with said tubular member, said upper heating element being disposed in loops, means securing the upper portions of said loops to the upper portion of said tube, and said lower heating element being disposed in loops, means for securing the lower portions of the loops of said heating element to the lower portion of said tube, and means for securing the upper portions of the loops of said lower heating element to the lower portions of the loops of said upper heating element under a tension whereby said heating elements will each lie in contact with the outer surface of said tube and together will extend for substantially the whole length of the tube, the upper ends of the loops of the lower heating element and the lower ends of the loops of the upper heating element being arranged in staggered relationship at the middle portion of said tube.

3. In combination with a fractionating column having an inlet at the lower end and an outlet at the upper end, separate externally disposed heating units for the lower and upper portions thereof, said heating units overlapping each other at the middle portion of the column so that the heat developed at said middle portion per unit of length of the column will be greater than that developed by the heating unit disposed at the upper portion, and less than that developed by the heating unit disposed at the lower portion, and separate control means for each of said heating units, whereby the heat developed by the lower heating elements will substantially equalize the heat loss of the lower portion of said fractionating column and whereby the heat developed by the upper heating element will substantially equalize the heat loss of the upper portion of the column.

4. In combination with a fractionating column having separate heating units for the end portions thereof, said heating units overlapping each other at the middle portion of the column so that the heat developed per unit of area in the middle portion will be greater than that developed by one of said heating units, and less than that developed by the other of said heating units, whereby a substantially uniform gradient of developed heat is maintained, and means to regulate the heat developed by one of said heating units, whereby the heat developed by said heating units per unit of area can be regulated to correspond substantially with the heat developed by the fractionating column as the boiling point of mixture to be fractionated increases.

FLOYD TODD.